United States Patent

Kohno et al.

[11] Patent Number: 6,112,457
[45] Date of Patent: Sep. 5, 2000

[54] PROCESS FOR PRESERVATION OF GERMINATED SEEDS

[75] Inventors: Yasushi Kohno; Takamichi Maejima; Kazuhiro Inose; Yugo Nishiyama, all of Himeji, Japan

[73] Assignee: Agritecno Yazaki Co. Ltd., Hyogo-ken, Japan

[21] Appl. No.: 08/965,571

[22] Filed: Nov. 6, 1997

[30] Foreign Application Priority Data

Jun. 27, 1997 [JP] Japan .................................. 9-171640
Jun. 27, 1997 [JP] Japan .................................. 9-171641

[51] Int. Cl.⁷ .................................................. A01C 1/06
[52] U.S. Cl. ............................................ 47/57.6; 47/58.1
[58] Field of Search .................... 47/57.6, 58.1, 47/DIG. 9

[56] References Cited

U.S. PATENT DOCUMENTS

| | | | |
|---|---|---|---|
| 4,631,860 | 12/1986 | Broughton | 47/58.1 |
| 4,905,411 | 3/1990 | Finch-Savage | 47/58.1 |
| 5,236,469 | 8/1993 | Carlson et al. | 47/57.6 |
| 5,238,835 | 8/1993 | McKersie et al. | 47/58.1 X |
| 5,522,907 | 6/1996 | Bruggink et al. | 47/58.1 |
| 5,585,536 | 12/1996 | Bruggink et al. | 47/57.6 X |
| 5,787,824 | 8/1998 | Kohno | 47/57.6 X |
| 5,799,439 | 9/1998 | MacGregor | 47/57.6 |
| 5,910,050 | 6/1999 | Eastin | 47/58.1 |
| 5,918,413 | 7/1999 | Otani et al. | 47/57.6 |
| 5,930,949 | 8/1999 | Tsujimoto et al. | 47/57.6 |
| 5,950,360 | 9/1999 | Heinrich et al. | 57/58.1 |
| 5,974,734 | 11/1999 | Eastin | 47/58.1 |
| 5,992,091 | 11/1999 | Rowse et al. | 47/58.1 |

FOREIGN PATENT DOCUMENTS

| | | | |
|---|---|---|---|
| 61-24017 | 7/1986 | Japan . | |
| 63-71108 | 3/1988 | Japan . | |
| 5-63122 | 9/1993 | Japan . | |
| 7-14286 | 2/1995 | Japan . | |
| WO 87/01258 | 3/1987 | WIPO | 47/57.6 |

*Primary Examiner*—Michael J. Carone
*Assistant Examiner*—Jeffrey L Gellner
*Attorney, Agent, or Firm*—Knobbe, Martens, Olson & Bear, LLP

[57] ABSTRACT

A seed 9 is held in an aqueous gel 7 so as to constitute a seed covered with gel S. Seed covered with gel S is dried after seed 9 germinates. Otherwise, a through hole 12a is pierced vertically within a gel culture medium 12, a seed 13 is inserted into trough hole 12a, and gel culture medium 12 including seed 13 is dried after seed 13 germinates.

15 Claims, 2 Drawing Sheets

PROCESS FOR PRESERVATION OF GERMINATED SEEDS

BACKGROUND OF THE INVENTION

1. Field of the Invention

The present invention relates to a process for enabling gel covering seed or seeded gel culture media to be preserved so as to make them sprout at a large percentage, and for reducing the cost in transfer thereof by reducing the volume of seed covered with gel or of gel media.

2. Related Art

Generally, seed of vegetable or flower (they will be simply called seed hereafter) are sown directly onto a farm, a garden and the like, or are sown in a nursery for initial growth and subsequently transplanted to a farm, a garden and the like. However, directly sown seed are liable to suffer blight through soil. Also, if they are minute, they are liable to be carried away by rainwater or sprinkled water. Furthermore, they are liable to be eaten by birds, animals, vermin and the like, because they are near the ground surface.

For prevention against blight, which is one of the above mentioned harms, there are such well-known conventional methods as to soak seed in chemical composition fluid, to stick chemical composition powder to surfaces of seed, and to dry seed by heating, for example. However, in adopting the first method, it so occasionally happens that the medicine cannot permeate the soaked seed fully. The cloth of chemical composition covering seed, which is formed by the second method, peels off easily. Thus, the two methods are not satisfying for the prevention. The last method of the above has a problem in application thereof because the seeds may have been heat-denatured. If the application is erred, the seed dies.

For prevention against carrying away and eating by animals, a surface of a seed is covered with coating so as to enlarge the particle of the seed. Coating of seed enables seed sowing by machine or manual operation to be easy and accurate. Furthermore, it has such an advantage that chemical compositions like a germicide, a vermicide, a medicine for avoiding animals, a chemical composition for promoting nutrition (a fertilizer) and so on can be added to the coating. Accordingly, many studies and propositions about coating of seed have been made in recent years.

However, it is complicated to stick a coating to a seed is complicated because it requires so many processes that the surface of the seed is sprayed with dilute binder solution in water and the seed is revolved on chemical composition powder so as to be coated with the chemical composition powder. Furthermore, if seeds are small, they stick to each other, so that it is difficult in making particles of seed dividually.

Then, a technique of using aqueous gel for coating, as described in the Japanese Patent Publication Hei. 5-63122, for example, comes to be proposed. In the technique, water required for germination is contained within gel, and a seed is covered directly with oxygen, required for germination when it is coated. Furthermore, an apparatus for covering seed with gel, which is described in the above cited document, can coat plane or minute seed besides spherical seed.

The above said method of covering seed with gel will be explained. A seed and air supplying pipe (a plunger) is inserted into a nozzle, an annular gel flowing hole is formed between the inner side of the nozzle and the outer side of the end portion of the seed and air supplying pipe. When gel flows out from the gel flowing hole, a membrane of gel including air is formed at the bottom opening of the gel flowing hole. Then, a seed is dropped into the seed and air supplying pipe, thereby the seed is included together with the air in the membrane of gel, so that a gel including the seed and the air falls by the weight of itself of compression. The falling gel including the seed and the air comes to be substantially spherical by the surface tension thereof and falls into a hardener. The gel is soaked in the hardener for a predetermined time, so as to be hardened. Then, it is transferred into a washing water tank, so that the sticking hardener is washed off.

The seed covered with gel by such a manner are substantially of a size, so that they can be sown by a seeding machine. However, when they are left at room temperature, they germinate in a few days, so that a period of sowing by machine is restricted.

Then, as described in the Japanese Patent Publication Hei. 7-14286, they are dried and reserved until a period of sowing. When the period has come, they are supplied with water so as to be changed back into their original spherical shapes, so that they can be sown by a seeding machine. However, all the sown seed cannot germinate, because some seed are injured in processes of harvest, transferring, freeze-drying and the like, some are originally defective, and some are dead. The existence of such seed requires sowing extra, thinning and transplanting, thereby making complicated.

One object of the present invention is to provide a processing of seed covered with gel so that they can sprout at further high rate, can suffer a long-term reservation and are light enough to be carried easily.

On the other hand, some seed of vegetable or flower are cultured by gel culture media so as to prevent them from dead and delay of growth at their early vegetative periods. The Japanese Utility Model Publication Sho. 61-24017 and the Japanese Patent Laid Open Gazette Sho. 63-71108, for example, describe such a technique that gel is used for a culture medium.

According to the technique of the former cited document, a seed is covered with a cylindrical or square pillar-like shaped aqueous gel, and a hole toward the seed is bored within the gel before or after covering. The gel is supplied with water, so that it is enlarged to be between twice and a thousand times as large as the original. The seed germinates by getting water and nutritive substance from the gel, grows to the requested degree by getting oxygen of the outside through the hole, and is transplanted.

According to the technique of the latter cited document, a sheet of culture medium is made of gel. The sheet of culture medium (the gel sheet) is dried to be hardened. A seed is fixed onto the gel sheet. The gel sheet is supplied with water, so that the seed germinates. When the initiated seed grows to be a seedling of the requested growth, the gel sheet is cut into the predetermined size, and the seedling is transplanted together with the cut gel sheet.

The gel culture media used in the both techniques are small and light enough to be transferred and reserved easily. The seeded gel culture media are enlarged by supplying of water for germination. However, all the seed cannot germinate, because some seed are injured in processes of harvest, transferring and the like, some are originally defective, and some are dead. Furthermore, in case of the former technique, it so occasionally happens that a seed covered with gel is killed by excessive drying or a seed is injured by boring a hole. Also, in case of the latter technique, it so occasionally happens that even if a seed germinates, it cannot take its roots into the gel culture medium but along the surface thereof because of ease of their extension, thereby the germule withers. Furthermore, even if the seed takes its roots into the gel culture medium, it occasionally withers because of shortage of oxygen.

Thus, all the seed involve some seed which cannot germinate and some which wither in spite of germination, thereby it is necessary to seed extra. As a result, seedlings cannot be obtained more than the certain quantity.

The other object of the present invention is to provide a processing of a seeded gel culture medium so that the seed can sprout at further high rate, can suffer a long-term reservation and the seeded gel culture medium are light enough to be carried easily.

SUMMARY OF THE INVENTION

The summary of the invention will be described as the follows:

A seed is included in aqueous gel so as to be a seed covered with gel, and after the seed germinates, the gel including the seed is dried, so as to have moisture content between 30 and 95%, and preferably between 50% and 90%.

Also, a gel culture medium is pierced vertically by a through hole, a seed is inserted into the through hole, and after the seed germinates, the gel culture medium including the seed is dried, so as to have moisture content between 30% and 95%, and preferably between 50% and 90%.

DETAILED DESCRIPTION OF THE PREFERRED EMBODIMENTS

Seed usually receive previous processing for promoting germination, because rates of germination differ in accordance with each species of seed. For such a previous processing, there are some methods, for example, soaking seed in a germination promoting medical solution like a gibberellin solution, wearing testae, heating and cooling. The methods are chosen properly in accordance with each specific character of seed.

On the other hand, an aqueous gelling chemical composition is mixed with pure water so as to be a solution between 2 Wt % and 10 Wt % of aqueous gelling chemical composition in water. The solution is left for one or two hours, so that the aqueous gelling chemical composition swells is sufficiently by absorbing water, and is agitated so as to be a equal strong viscous fluid. Any material will do for the aqueous gelling medicine so long as it has the above said qualities. It can be chosen widely among natural gels, compound organic gels and inorganic gels. Besides vegetable matters, for example, an alkaline alginic salt, an alkaline carboxymethyl cellulose salt, an alkaline polyacrylic salt, carrageenan, gelatin, and agar, other gels will do it so long as they do not exert a harmful influence upon a human body so as to be used safely.

To the obtained aqueous gel are added kalium nitrate, ammonium hydrogen phosphate, and the like, which are required nutritions (fertilizers) for growth of plants, and besides them, are added the required quantities of a germicide, a vermicide, a medicine for avoiding animals and the like, which are well known to all. The viscosity of the gel is regulated to be enough for the next processing.

Next, an apparatus for covering seed with such aqueous gel will be described simply according to FIG. 1.

Figure 1:
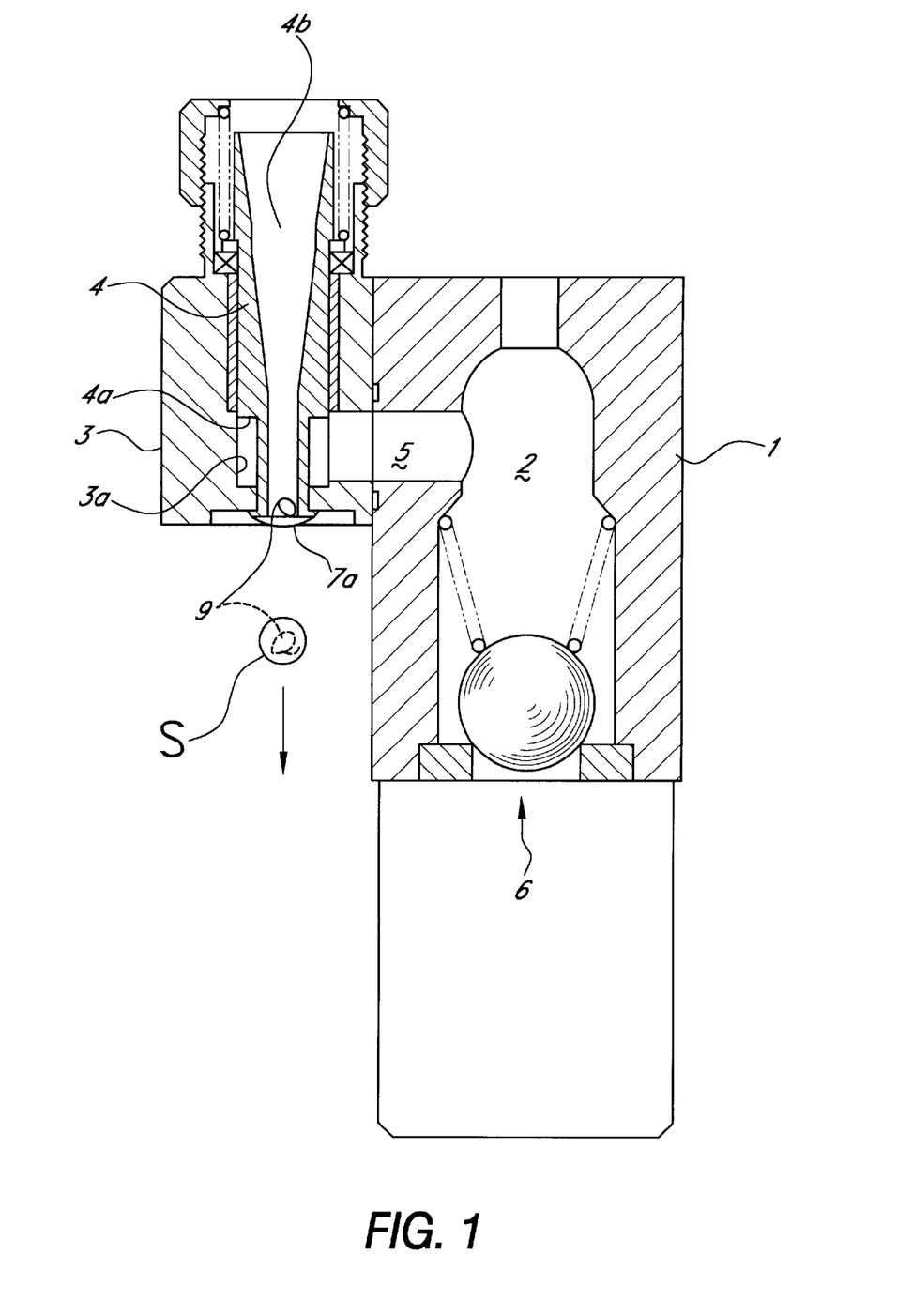
FIG. 1 is a sectional view of a gel processing nozzle apparatus.

As shown in FIG. 1, a gel chamber 2 for containing a covering medicine (a gelling medicine) is formed within a valve case 1. Gel chamber 2 is connected with a gel tank through a check valve 6. A nozzle case 3 is attached to a side portion of valve case 1. Nozzle case 3 is pierced vertically by an inserting hole 3a. An annular nozzle plunger 4 is inserted into inserting hole 3a. A flange 4a is formed at the circumference of nozzle plunger 4. The lower surface of flange 4a receives the pressure of gel chamber 2. The upper surface thereof receives a spring which biases nozzle plunger 4 downwardly. The lower end of nozzle plunger 4 is a valve portion which can shut the lower end of inserting hole 3a.

An inserting hole (not shown) is bored from gel chamber 2 and is open on the external surface of valve case 1. A compressing plunger is inserted into the inserting hole, so that the gel in gel chamber 2 is compressed and decompressed by reciprocating of the compressing plunger. A space between inserting hole 3a and nozzle plunger 4 is connected with gel chamber 2 through a connecting hole 5.

In such a construction, when the compressing plunger enters gel chamber 2, the pressure in gel chamber 2 rises, so as to compress the pressure receiving surface of flange 4a. Accordingly, nozzle plunger 4 is raised so as to open the valve portion at the lower end thereof, so that the gel flows out downwardly. When the flowing gel is discharged to a predetermined degree, nozzle plunger 4 falls by bias of the spring, so as to shut the valve portion. The opening portion of the lower end of nozzle plunger 4 is shut by remaining gel, so as to form a gel membrane 7a. When the compressing plunger recedes, the interior of gel chamber 2 and of the gel flowing passage is decompressed, so as to open check valve 6, thereby is supplied with gel from the gel tank.

Simultaneously, nozzle plunger 4 is supplied with a seed 9 from the above thereof. Seed 9 falls through a passing hole 4b bored along the axis of nozzle plunger 4, and is set on gel membrane 7a. When the compressing plunger enters gel chamber 2, the flowing gel includes an air bubble and seed 9 and falls. During the falling thereof, the gel comes to be spherical by the surface tension thereof and a seed covered with gel S falls into a hardener tank. It is soaked in a hardener within the hardener tank, so that the covering gel is hardened. Afterward, it is washed. Such operations are repeated, so that seeds covered with hardened gel can be obtained continuously.

Figure 2:
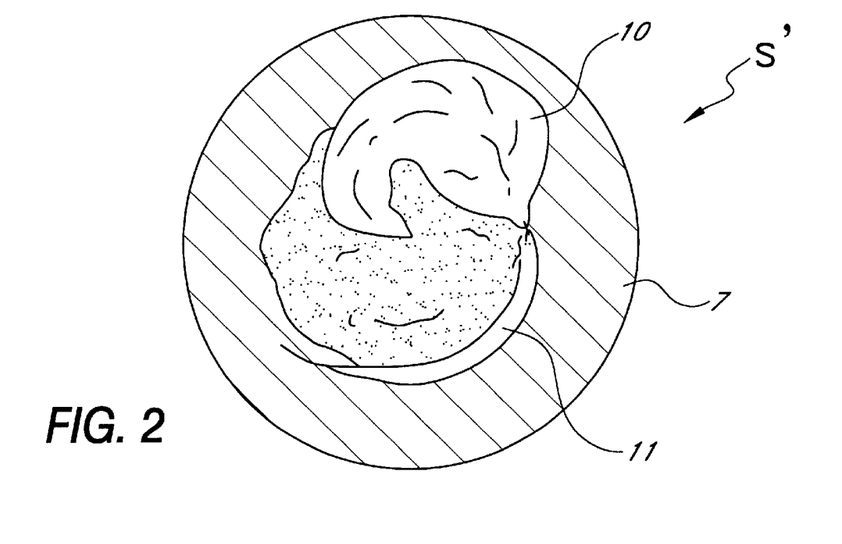
FIG. 2 is a sectional view of a germinating seed covered with gel.

According to the present invention, such obtained seeds covered with gel S are left for several ten hours or for several days at a room temperature (22° C.–26° C.), so as to promote germination. As shown in FIG. 2 (spherical shape) and FIG. 3 (cylindrical shape with a hole 12a), from each seed (13 in FIG. 3) covered with gel S', an initial sprout 10 (14 in FIG. 3) and a radicle 11 (15 in FIG. 3) grow to several millimeters, which is not so long as to tear its testa, in gel 7 (12 in FIG. 3), and afterwards, is rapidly dried by a drying apparatus, so that the moisture content comes to be between 30% and 95%, and preferably between 50% and 90%. The drying method is not restricted. For example, drying by warm wind and silica gel can do it. Dried seeds covered with gel obtained by such a manner are reserved at a low temperature until just before sowing.

Such dried seed covered with gel S' can be reserved for a long time, because of restriction of water content and temperature required for growth. Accordingly, any quantity of dried seed covered with gel S' can be chosen for sowing, thereby enabling a sowing period to be controlled. Also, dried seed covered with gel S' is lightened and compacted because of diminution of water. Furthermore, dead seed and defective seed are removed before reservation, only germinating ones are reserved and sown, thereby making the rate of culture higher.

The dried gel surrounding seed is excellent in restoration to the original gel state by addition of water, so that the dried gel supplied with water absorbs water and return to the original gel, so as to hold water of the required quantity for germination. Also, the oxygen which is required for germination can be obtained sufficiently from the air included in the gel. The seeds covered with restored gel have germinated, however, the gel keep in their spherical shapes, so that the seeds covered with gel can be sown by a seeding machine.

Next, concrete embodiments, in case that germinating seed covered with gel are dried, the dried gel covering the seed is restored, and the seed covered with gel are sown, will be explained.

The First Embodiment

A 3 Wt % solution of sodium alginate in water was used as a coating, and a 10 Wt % solution of calcium chloride in water was used as a hardener.

The coating was made to include each seed of beet (the name of the sort thereof is Humming) by the above described nozzle having a double cylinder, was formed into a particle, and was hardened (gelled) by the hardener and washed, so that each seed covered with gel came to have a diameter of 9.5 mm and an average weight of 0.649 g.

All sample seed covered with gel were held in a pyrostat at 25° C. for 12 hours and were continuously held therein at 15° C. for 12 hours, resulting they were held for 24 hours, so as to be made to germinate. Only sample seed which had taken their radicles into gel were chosen from them all, so that many germinating seed covered with gel could be provided.

In the experimental area 1, the above seed of beet, which had not been covered with gel, were soaked in water for four hours.

In the experimental areas 2 (2-1 to 2-6), the germinating seed covered with gel were set on filter paper laid on 1 kg of silica gel spread on a inner bottom surface of a container, and were covered with another filter paper equally covered all over with other 1 kg of silica gel in the container. The container was made airtight.

They were dried by such a manner using silica gel for 4, 8, 12, 16, 20, and 24 hours, and the percentage of moisture content thereof were measured by an infrared diversion device. The results are reported in the following Table.

TABLE

| Experimental Area | 2-1 | 2-2 | 2-3 | 2-4 | 2-5 | 2-6 |
|---|---|---|---|---|---|---|
| Drying Hours | 4 | 8 | 12 | 16 | 20 | 24 |
| Moisture Content (%) | 89.7 | 78.3 | 70.4 | 56.2 | 7.8 | 7.8 |

In the experimental areas 3 (3-1 to 3-5), the germinating seed covered with gel were set in a single layer on a stainless-steel net of 2 mm meshes, and were dried by dry wind of 30° C. and of 10% relative humidity from below the net. The wind which had passed through them were discharged from a drying room.

They were dried by such a manner using dry wind for 1, 1.5, 2, 2.5, and 3 hours, and the percentages of moisture content thereof were measured by an infrared diversion device. The results are reported in the following Table.

TABLE

| Experimental Area | 3-1 | 3-2 | 3-3 | 3-4 | 3-5 |
|---|---|---|---|---|---|
| Drying Hours | 1 | 1.5 | 2 | 2.5 | 3 |
| Moisture Content (%) | 89.8 | 81.9 | 64.2 | 20.5 | 6.7 |

The seed of the experimental group 4 were germinating seed covered with gel which had not been dried In each experimental area, the seed or the germinating seed covered with gel were divided into one group held in a refrigerator at 8° C. and the other group held at room temperature, and they were both left for 30 days. Afterward, in the experimental groups 2 and 3, the germinating seed covered with gel were soaked in water so as to be restored to the original sizes and shapes thereof and were provided for an experiment of sprouting in soil.

In the experiment of sprouting, 400 seed of each experimental area were sown into soil of volcanic with 15 mm of depth at 10° C. of an average day temperature and at 3° C. of an average night temperature. From the day next to the sowing day, their sprouting were observed. The seed of the experimental area 4 had their roots projecting from gel, when they were held at room temperature. Thus, only seed thereof held at low temperature were sampled for the experiment. The results of quantity of seed of each experimental area which sprouted are reported in the following Table. In the Table, E.A. is Experimental Area, S.R. is State of Reservation (the temperature of reservation), L is low temperature, and R is room temperature. The numbers of the axis of abscissas designate the days elapsed for sprouting.

TABLE

| E.A. | S.R. | 1 | 2 | 3 | 4 | 5 | 6 | 7 | 8 | 9 | 10 | 11 |
|---|---|---|---|---|---|---|---|---|---|---|---|---|
| 1 | L | 0 | 0 | 0 | 0 | 0 | 0 | 4 | 10 | 69 | 117 | 248 |
|  | R | 0 | 0 | 0 | 0 | 0 | 0 | 14 | 33 | 84 | 128 | 261 |
| 2-1 | L | 0 | 0 | 0 | 27 | 122 | 239 | 313 | 321 | 324 | 326 | 327 |
|  | R | 0 | 0 | 3 | 42 | 152 | 248 | 279 | 291 | 305 | 312 | 319 |
| 2-2 | L | 0 | 0 | 0 | 21 | 111 | 221 | 322 | 337 | 339 | 341 | 345 |
|  | R | 0 | 0 | 2 | 49 | 151 | 253 | 298 | 303 | 317 | 322 | 331 |
| 2-3 | L | 0 | 0 | 0 | 9 | 93 | 229 | 331 | 343 | 346 | 352 | 353 |
|  | R | 0 | 0 | 1 | 31 | 143 | 249 | 307 | 314 | 323 | 336 | 339 |
| 2-4 | L | 0 | 0 | 0 | 0 | 16 | 131 | 269 | 334 | 352 | 363 | 369 |

TABLE-continued

| E.A. | S.R. | 1 | 2 | 3 | 4 | 5 | 6 | 7 | 8 | 9 | 10 | 11 |
|---|---|---|---|---|---|---|---|---|---|---|---|---|
| | R | 0 | 0 | 0 | 0 | 22 | 153 | 273 | 332 | 343 | 351 | 362 |
| 2-5 | L | 0 | 0 | 0 | 0 | 0 | 0 | 0 | 0 | 0 | 0 | 0 |
| | R | 0 | 0 | 0 | 0 | 0 | 0 | 0 | 0 | 0 | 0 | 0 |
| 2-6 | L | 0 | 0 | 0 | 0 | 0 | 0 | 0 | 0 | 0 | 0 | 0 |
| | R | 0 | 0 | 0 | 0 | 0 | 0 | 0 | 0 | 0 | 0 | 0 |
| 3-1 | L | 0 | 0 | 2 | 23 | 125 | 236 | 315 | 319 | 328 | 330 | 331 |
| | R | 0 | 0 | 1 | 31 | 149 | 243 | 283 | 290 | 301 | 309 | 315 |
| 3-2 | L | 0 | 0 | 0 | 22 | 108 | 224 | 323 | 340 | 341 | 343 | 349 |
| | R | 0 | 0 | 0 | 14 | 148 | 255 | 301 | 311 | 318 | 324 | 329 |
| 3-3 | L | 0 | 0 | 0 | 11 | 89 | 225 | 332 | 345 | 350 | 354 | 354 |
| | R | 0 | 0 | 1 | 23 | 139 | 251 | 311 | 316 | 327 | 332 | 335 |
| 3-4 | L | 0 | 0 | 0 | 0 | 0 | 0 | 4 | 7 | 10 | 10 | 10 |
| | R | 0 | 0 | 0 | 0 | 0 | 7 | 7 | 5 | 5 | 5 | 5 |
| 3-5 | L | 0 | 0 | 0 | 0 | 0 | 0 | 0 | 0 | 0 | 0 | 0 |
| | R | 0 | 0 | 0 | 0 | 0 | 0 | 0 | 0 | 0 | 0 | 0 |
| 4 | L | 0 | 0 | 2 | 25 | 121 | 240 | 311 | 323 | 325 | 325 | 326 |

The Second Embodiment

A mixture solution of 2.3 Wt % carrageenan, 0.8 Wt % potassium nitrate, 0.9 Wt % sorbit and 96 Wt % water, which had been held in a water bath at 65° C. and had been agitated, was used as a coating. Water of 2° C. was used as a hardener, because the mixture solution is hardened by refrigeration.

The coating was made to include each seed of beet (the name of the sort thereof is Humming) by the above described nozzle having a double cylinder, was formed into a particle, and was hardened (gelled) by the hardener and washed, so that each seed covered with gel came to have a diameter of 9.5 mm and an average weight of 0.683 g.

For germination, all sample seed covered with gel were held similarly to that of the first experiment in a pyrostat at 25° C. for 12 hours and were continuously held therein at 15° C. for 12 hours. As a result, they were held for 24 hours. Only sample seed, which had taken their radicles into gel were chosen from them all, so that many germinating seed covered with gel could be provided.

In the second experiment, each of the experimental areas from 1 to 4 were defined similarly to those of the first experiment. By the same manners as the processing prior to reservation of the first experiment, the seed without coating of gel of the experimental area 1 were soaked in water, the germinating seed covered with gel of the experimental areas 2 (2-1 to 2-6) and 3 (3-1 to 3-5) were dried and restored, the germinating seed covered with gel of the experimental areas 4 were not soaked or dried, and they were all reserved at low temperature or at room temperature.

The results of measure of the percentages of moisture content of the dried germinating seed covered with gel in the experimental areas 2 (2-1 to 2-6) are reported in the following Table.

TABLE

| Experimental Area | 2-1 | 2-2 | 2-3 | 2-4 | 2-5 | 2-6 |
|---|---|---|---|---|---|---|
| Drying Hours | 4 | 8 | 12 | 16 | 20 | 24 |
| Moisture Content (%) | 90.3 | 75.2 | 63.7 | 51.0 | 8.1 | 7.9 |

The results of measure of the percentages of moisture content of the dried germinating seed covered with gel in the experimental areas 3 (3-1 to 3-5) are reported in the following Table.

TABLE

| Experimental Area | 3-1 | 3-2 | 3-3 | 3-4 | 3-5 |
|---|---|---|---|---|---|
| Drying Hours | 1 | 1.5 | 2 | 2.5 | 3 |
| Moisture Content (%) | 91.7 | 83.2 | 60.1 | 26.5 | 7.2 |

The seed which had been processed and reserved were sown so as to sprout by the same manner as the first experiment. The results of quantity of seed of each experimental area which sprouted are reported in the following Table. In the Table, reference initials and numbers designate the same with the first experiment.

TABLE

| E.A. | S.R. | 1 | 2 | 3 | 4 | 5 | 6 | 7 | 8 | 9 | 10 | 11 |
|---|---|---|---|---|---|---|---|---|---|---|---|---|
| 1 | L | 0 | 0 | 0 | 0 | 0 | 0 | 1 | 12 | 71 | 110 | 251 |
| | R | 0 | 0 | 0 | 0 | 0 | 0 | 11 | 32 | 87 | 131 | 260 |
| 2-1 | L | 0 | 0 | 1 | 18 | 114 | 221 | 298 | 302 | 303 | 303 | 311 |
| | R | 0 | 0 | 2 | 31 | 143 | 239 | 264 | 276 | 281 | 291 | 294 |
| 2-2 | L | 0 | 0 | 0 | 12 | 103 | 200 | 303 | 312 | 319 | 322 | 322 |
| | R | 0 | 0 | 1 | 29 | 145 | 245 | 280 | 283 | 298 | 301 | 303 |
| 2-3 | L | 0 | 0 | 0 | 1 | 86 | 221 | 312 | 319 | 324 | 333 | 334 |
| | R | 0 | 0 | 2 | 31 | 135 | 235 | 286 | 292 | 301 | 317 | 318 |
| 2-4 | L | 0 | 0 | 0 | 0 | 18 | 124 | 258 | 316 | 329 | 345 | 348 |
| | R | 0 | 0 | 0 | 0 | 20 | 147 | 258 | 317 | 322 | 336 | 342 |
| 2-5 | L | 0 | 0 | 0 | 0 | 0 | 0 | 0 | 0 | 0 | 0 | 0 |
| | R | 0 | 0 | 0 | 0 | 0 | 0 | 0 | 0 | 0 | 0 | 0 |
| 2-6 | L | 0 | 0 | 0 | 0 | 0 | 0 | 0 | 0 | 0 | 0 | 0 |

TABLE-continued

| E.A. | S.R. | 1 | 2 | 3 | 4 | 5 | 6 | 7 | 8 | 9 | 10 | 11 |
|------|------|---|---|---|---|---|---|---|---|---|----|----|
|      | R    | 0 | 0 | 0 | 0 | 0 | 0 | 0 | 0 | 0 | 0  | 0  |
| 3-1  | L    | 0 | 0 | 1 | 18 | 118 | 229 | 298 | 301 | 309 | 312 | 313 |
|      | R    | 0 | 0 | 0 | 24 | 146 | 232 | 269 | 272 | 284 | 286 | 292 |
| 3-2  | L    | 0 | 0 | 0 | 18 | 103 | 211 | 304 | 318 | 321 | 322 | 322 |
|      | R    | 0 | 0 | 0 | 14 | 142 | 247 | 281 | 290 | 299 | 304 | 305 |
| 3-3  | L    | 0 | 0 | 0 | 8 | 86 | 218 | 317 | 324 | 334 | 336 | 336 |
|      | R    | 0 | 0 | 0 | 21 | 134 | 238 | 293 | 298 | 304 | 314 | 314 |
| 3-4  | L    | 0 | 0 | 0 | 0 | 0 | 0 | 2 | 4 | 12 | 13 | 16 |
|      | R    | 0 | 0 | 0 | 0 | 0 | 1 | 3 | 4 | 4 | 7 | 8 |
| 3-5  | L    | 0 | 0 | 0 | 0 | 0 | 0 | 0 | 0 | 0 | 0 | 0 |
|      | R    | 0 | 0 | 0 | 0 | 0 | 0 | 0 | 0 | 0 | 0 | 0 |
| 4    | L    | 0 | 0 | 0 | 21 | 114 | 231 | 292 | 296 | 304 | 304 | 309 |

The Results

The results of the above first and second experiments are as the follows:

The rate of sprouting of seed dried by silica gel were substantially the same as the rate thereof dried by dry wind, or were a little higher. Also, as shown in the results of the experimental areas 2-5, 2-6, and 3-5, when the seed were dried so long as their moisture contents reached less than 10%, they did not sprout. The initial sprouts and roots thereof were thought to be dead. When they were dried so long as their moisture contents reached approximately 20%, as shown in the result of the experimental area 3-4, the rate of sprouting was lowered remarkably.

Furthermore, the rate of sprouting of seed without gel of the experimental area 1 was lower than that of germinating seed covered with gel of the experimental area 4. It is supposed that there were some defective seed and some seed injured through the soil in the seed of the experimental area 1. The reason why the seed covered with gel were promoted to grow up after germination is suggested that the nutrition, the germicide, the vermicide, the medicine for avoiding animals and the like, which were mixed with gel, promoted their growth after germination.

Furthermore, the rate of sprouting of seed covered with gel of the other experimental areas 2-1, 2-2, 2-3, 2-4, 3-1, 3-2, and 3-3, which had been dried, was substantially the same as that of seed covered with gel of the experimental area 4, which had not been dried. There was not shown that drying exerted a bad influence upon them. As a result, even if germinating seed covered with gel are dried so long as their moisture content reaches between 30 and 90%, just when they are restored by supplying water, they can sprout at substantially the same rate as the seed which have not been dried.

The above processing of seed covered with gel for reservation according to the present invention brings the following effects:

Since the seed covered with gel are dried after germination thereof, seed which have not germinated can be removed so as to increase the rate of sprouting, thereby diminishing such processes as thinning and transplanting after growing up to some degree.

Also, since the volume and weight of seed can be reduced, in case that seed covered with gel are produced in large quantities, they can be carried easily and the space for reservation and transfer can be small, so as to reduce cost. Furthermore, they can be reserved for a long time, so that mass seed covered wit gel can be produced until sowing period and can be restored to the original corresponding to the sowing period and can be sown in requested quantity. The restoring is easy because of requiring just supplying water.

Next, the processing of gel culture media for reservation of the present invention will be explained.

Similarly to the above processing of seed covered with gel, seed usually receive previous processing for promoting germination, because rates of germination differ in accordance with each species of seed. For such a previous processing, there are some methods, for example, soaking seed in a germination promoting medical solution like a gibberellin solution, wearing testae, heating and cooling. The methods are chosen properly in accordance with each specific character of seed.

On the other hand, for producing gel culture media, an aqueous gelling medicine is mixed with pure water so as to be a solution between 2 Wt % and 10 Wt % of aqueous gelling chemical composition in water. The solution is left for one or two hours, so that the aqueous gelling chemical composition swells sufficiently by absorbing water, and is agitated so as to be a equal strong viscous fluid. Any material will do for the aqueous gelling chemical composition so long as it has the above said qualities. It can be chosen widely among natural gels, compound organic gels and inorganic gels. Besides vegetable matters, for example, an alkaline alginic salt, an alkaline carboxymethyl cellulose salt, an alkaline polyacrylic salt, carrageenan, gelatin, and agar, other gels will do it so long as they do not exert a harmful influence upon a human body so as to be used safely.

In case of using sodium alginate or pectin, a crosslinking agent including crosslinking ion like calcium ion of calcium sulfate must be added, because a simple substance of each of them dissolved in water does not form gel.

Sodium polyphosphate like sodium tripolyphosphate can be preferably added so as to adjust the action of the crosslinking agent.

In case of using carboxymethyl cellulose, crosslinking agent like alum must be added.

Each gel culture medium preferably contains a hydrate, so that a seed, which requires a long term for germination, can germinate easily, and the seed can be supplied with sufficient water content, resulting in high rate of sprouting and high rate of harvest.

Furthermore, the gel culture medium preferably contains a fertilizer having an effect on the growth of the plant. Whichever the fertilizer is organic or inorganic, any fertilizer can do it so long as it has an effect on the growth of the plant. However, such a fertilizer as to disturb gelling or harden gel, thereby disturbing the growth of the plant, must be excepted.

If the gel culture medium contains an antiseptic, the gel can be prevented from septicity. As a result, the increase of harmful bacilli can be prevented so as to prevent blight and the like of the plant.

Figure 3:
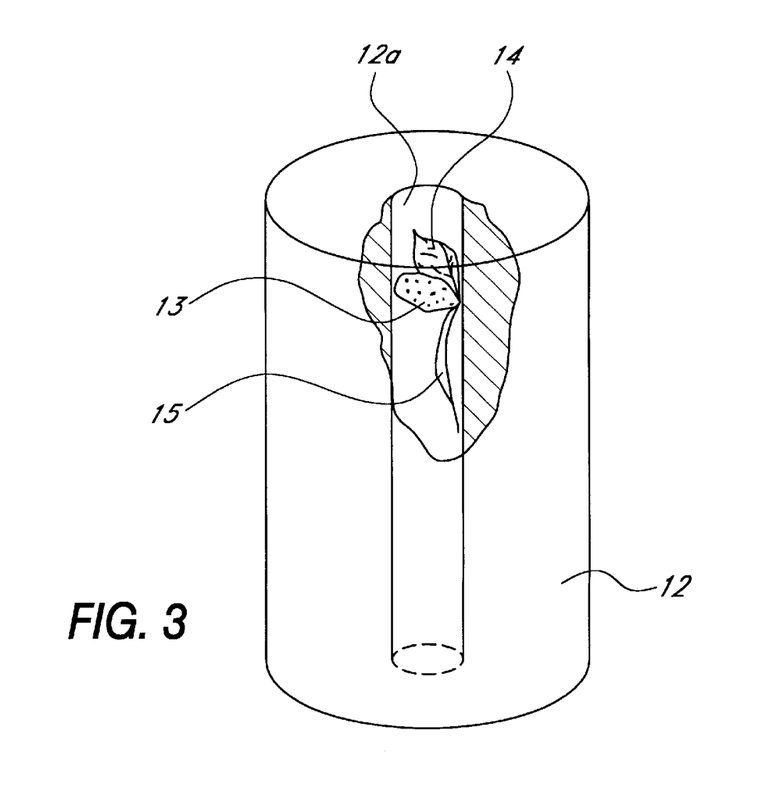
FIG. 3 is a perspective view partly in section showing a germinating seed inserted in a gel culture medium.

A gel culture medium of the present invention is poured into a mold so as to be a solid, for example, a cylinder, a square-pillar, a box, a cube, or a sheet, of a certain size. In the referred embodiment, gel 12 is cylindrical shaped and pierced by a through hole 12a. Through hole 12a has a diameter corresponding to a size of a seed to be cultured, and is disposed along a direction of extension of a radicle of the seed. The air (oxygen) enters the upper and lower openings of through hole 12a. Even if the radicle has grown to be so thick to fill in the portion of through hole 12a for growth of roots, oxygen enters the lower opening of the portion of through hole 12a so as not to hinder the growth of the radicle or root. Through hole 12a is so wide as the seed to be cultured or is narrower than it, and is preferably wider than the radicle of the seed, because the upper portion of through hole 12a is prevented from being filled with the radicle so as to be supplied with sufficient oxygen.

According to the processing of a gel culture medium of the present invention, a seed 13 is inserted into through hole 12a of gel culture medium 12 and is left at room temperature between 22° C. and 26° C. for several hours or for several days, so that the seed germinates with a germule 14 and a radicle 15 of several millimeters. Afterward, gel culture medium 12 is dried to be of the moisture content between 30 and 95%, and preferably between 50% and 90%. Such dried gel culture medium 12 including germinating seed 13 is reserved at low temperature until the sowing period.

Such drying enables gel culture medium 12 including seed 13 to be proof against long term reservation and to be lightened and compacted in proportion to decrease of water content. Furthermore, gel culture media 12 including dead or defective seed 13 are removed before reservation, only gel culture media 12 including germinating seed 13 are reserved and the germinating seed 13 are made to sprout so as to be seedlings, thereby making the rate of culture higher.

The dried gel surrounding seed 13 is excellent in restoration to the original gel state by addition of water, so that the dried gel culture medium 12 supplied with water absorbs water and returns to the original gel, so as to hold water of the required quantity for germination. Also, the oxygen which is required for germination can be obtained sufficiently from the atmosphere through the through hole 12a. Plants which have sprouted as seedlings are transplanted by manual operation or by a transplanting machine.

Next, concrete embodiments, in case that gel culture media including germinating seed are dried, the dried gel culture media is restored, and the seed are cultured, will be explained.

The Third Embodiment

A mixture solution of 2.0 Wt % carrageenan, 0.5 Wt % potassium nitrate, 1.0 Wt % sorbit and 96.5 Wt % water, which had been held in a water bath at 65° C. and had been agitated, was used as a gelling. For the purpose of making each cylindrical gel block, the gelling was poured into a cylindrical mold having the inside diameter of 18 mm and the depth of 100 mm and was hardened by cooling at room temperature.

After each gel cylindrical block had been hardened, a through hole having a diameter of 2 mm was pierced therein along the axis between both centers of the upper and lower surfaces by a thin pipe, so as to provide a gel culture medium. A seed of a beet (the name of the sort thereof is Humming) was sown in the through hole of each gel culture medium with a depth of 5 mm from the upper surface.

The seeded gel culture media were held in a pyrostat with a day temperature of 20° C. and a night temperature of 10° C. for three days, so as to make the seed germinate.

The experimental area 5, seed were respectively sown into the soil having a depth of 95 mm filled in each paper cylinder having an inside diameter of 18 mm and a depth of 100 mm.

In the experimental area 6 (6-1 to 6-6), each gel culture medium including a germinating seed was disposed in an airtight container having more depth than the height of the initiated seed. Silica gel was disposed in each container in state of covering all over the whole outside of the gel culture medium. After lids were put of the containers respectively, the containers were held at room temperature.

The seeded gel culture media of the experimental area 6 were dried by a such a manner for 4, 8, 12, 16, 20, and 24 hours, and the percentages of moisture content thereof were measured by an infrared diversion device. The results are reported in the following Table.

TABLE

| Experimental Area | 6-1 | 6-2 | 6-3 | 6-4 | 6-5 | 6-6 |
|---|---|---|---|---|---|---|
| Drying Hours | 4 | 3 | 12 | 16 | 20 | 24 |
| Moisture Content (%) | 91.6 | 82.1 | 73.0 | 59.3 | 14.7 | 9.9 |

The germinating seed covered with gel of the experimental areas 7 (7-1 to 7-5) were set in a single layer on a stainless-steel net of 2 mm meshes, and were dried by dry wind of 30° C. and of 12% relative humidity from below the net. The wind which had passed through them were discharged from a drying room.

They were dried by such a manner using dry wind for 1, 1.5, 2, 2.5, and 3 hours, and the percentages of moisture content thereof were measured by an infrared diversion device. The results are reported in the following Table.

TABLE

| Experimental Area | 7-1 | 7-2 | 7-3 | 7-4 | 7-5 |
|---|---|---|---|---|---|
| Drying Hours | 1 | 1.5 | 2 | 2.5 | 3 |
| Moisture Content (%) | 92.3 | 83.0 | 62.7 | 21.2 | 8.6 |

The seed of the experimental group 8 were germinating seed covered with gel which had not been dried.

In each experimental area, the seed or the germinating seed covered with gel were divided into one group held in a refrigerator at 8° C. and the other group held at room temperature. They were all left for 30 days. Afterward, the experimental area 6 (6-1 to 6-6) and 7 (7-1 to 7-5) were restored by supplying water, were disposed in a plastic greenhouse with an average day temperature of 21° C. and with an average night temperature of 8° C., and were sprinkled with water so as to be grown up into seedlings. The quantity of seed which had come to be seedlings in each experimental area was researched. 400 seed were sampled in each experimental area. The seed of the experimental area 8 had sprouted when they were held at room temperature. Thus, only seed thereof held at low temperature were sampled for the experiment. The results of quantity of seed of each experimental area which sprouted are reported in the following Table. In the Table, E.A. is Experimental Area, S.R. is State of Reservation (the temperature of reservation), L is low temperature, and R is room temperature. The numbers of the axis of abacissas designate the days elapsed for sprouting.

TABLE

| E.A. | S.R. | 1 | 2 | 3 | 4 | 5 | 6 | 7 | 8 | 9 | 10 | 11 |
|---|---|---|---|---|---|---|---|---|---|---|---|---|
| 5 | L | 54 | 59 | 76 | 109 | 227 | 273 | 284 | 291 | 295 | 297 | 299 |
|  | R | 312 | 312 | 312 | 313 | 313 | 313 | 313 | 313 | 313 | 313 | 314 |
| 6-1 | L | 0 | 0 | 12 | 27 | 84 | 172 | 293 | 332 | 347 | 359 | 362 |
|  | R | 0 | 0 | 8 | 28 | 79 | 185 | 281 | 314 | 338 | 348 | 353 |
| 6-2 | L | 0 | 0 | 12 | 20 | 65 | 153 | 202 | 261 | 290 | 326 | 341 |
|  | R | 0 | 0 | 10 | 18 | 52 | 158 | 212 | 259 | 286 | 327 | 339 |
| 6-3 | L | 0 | 0 | 9 | 13 | 49 | 114 | 171 | 230 | 278 | 301 | 328 |
|  | R | 0 | 0 | 10 | 20 | 67 | 163 | 273 | 301 | 329 | 340 | 351 |
| 6-4 | L | 0 | 0 | 1 | 29 | 48 | 98 | 190 | 243 | 255 | 263 | 265 |
|  | R | 0 | 0 | 2 | 18 | 24 | 56 | 134 | 173 | 202 | 221 | 239 |
| 6-5 | L | 0 | 0 | 0 | 0 | 0 | 0 | 0 | 0 | 0 | 0 | 0 |
|  | R | 0 | 0 | 0 | 0 | 0 | 0 | 0 | 0 | 0 | 0 | 0 |
| 6-6 | L | 0 | 0 | 0 | 0 | 0 | 0 | 0 | 0 | 0 | 0 | 0 |
|  | R | 0 | 0 | 0 | 0 | 0 | 0 | 0 | 0 | 0 | 0 | 0 |
| 7-1 | L | 0 | 0 | 8 | 24 | 84 | 180 | 246 | 303 | 344 | 353 | 358 |
|  | R | 0 | 0 | 13 | 25 | 79 | 174 | 244 | 295 | 320 | 339 | 347 |
| 7-2 | L | 0 | 0 | 9 | 24 | 92 | 188 | 254 | 332 | 354 | 361 | 363 |
|  | R | 0 | 0 | 11 | 26 | 98 | 190 | 250 | 332 | 350 | 358 | 358 |
| 7-3 | L | 0 | 0 | 0 | 24 | 46 | 85 | 156 | 200 | 225 | 240 | 252 |
|  | R | 0 | 0 | 5 | 21 | 44 | 90 | 148 | 192 | 222 | 243 | 221 |
| 7-4 | L | 0 | 0 | 0 | 0 | 0 | 0 | 0 | 0 | 0 | 0 | 0 |
|  | R | 0 | 0 | 0 | 0 | 0 | 0 | 0 | 0 | 0 | 0 | 0 |
| 7-5 | L | 0 | 0 | 0 | 0 | 0 | 0 | 0 | 0 | 0 | 0 | 0 |
|  | R | 0 | 0 | 0 | 0 | 0 | 0 | 0 | 0 | 0 | 0 | 0 |
| 8 | L | 65 | 67 | 78 | 130 | 251 | 320 | 341 | 356 | 363 | 363 | 364 |

The Fourth Experiment

A mixture solution of 1.0 Wt % carrageenan, 0.5 Wt % potassium nitrate, 1.0 Wt % sorbit, 1.0 Wt % guar gum, and 96.5 Wt % water, which had been heated at 65° C. and had been agitated, was used as a gelling. For the purpose of making each cylindrical gel block, the gelling was poured into a cylindrical mold having the inside diameter of 18 mm and the depth of 100 mm and was hardened by cooling at room temperature.

After each gel cylindrical block had been hardened, a through hole was pierced therein similarly to the third experiment so as to form a gel culture medium. A seed is sown into each gel culture medium similarly to the third experiment so as to germinate.

The seed of the experimental area 5 were sown similarly to those of the third experiment.

The seeded gel culture media of the experimental areas 6 (6-1 to 6-6) and 7 (7-1 to 7-5) were dried similarly to those of the third experiment.

The result of measure of the percentages of moisture content of those of the experimental areas 6 are reported in the following Table.

TABLE

| Experimental Area | 6-1 | 6-2 | 6-3 | 6-4 | 6-5 | 6-6 |
|---|---|---|---|---|---|---|
| Drying Hours | 4 | 8 | 12 | 16 | 20 | 24 |
| Moisture Content (%) | 90.0 | 79.2 | 73.5 | 59.6 | 14.7 | 9.1 |

The result of measure of the percentages of moisture content of those of the experimental areas 7 are reported in the following Table.

TABLE

| Experimental Area | 7-1 | 7-2 | 7-3 | 7-4 | 7-5 |
|---|---|---|---|---|---|
| Drying Hours | 1 | 1.5 | 2 | 2.5 | 3 |
| Moisture Content (%) | 91.2 | 82.6 | 66.1 | 23.8 | 9.5 |

The seed which had been processed and reserved were sown so as to sprout by the same manner as the third experiment. The results of quantity of seed of each experimental area which sprouted are reported in the following Table. In the Table, reference initials and numbers designate the same with the third experiment.

TABLE

| E.A. | S.R. | 1 | 2 | 3 | 4 | 5 | 6 | 7 | 8 | 9 | 10 | 11 |
|---|---|---|---|---|---|---|---|---|---|---|---|---|
| 5 | L | 54 | 59 | 76 | 109 | 227 | 273 | 284 | 291 | 295 | 297 | 299 |
|  | R | 312 | 312 | 312 | 313 | 313 | 313 | 313 | 313 | 313 | 313 | 314 |
| 6-1 | L | 0 | 0 | 11 | 13 | 59 | 117 | 175 | 233 | 279 | 301 | 326 |
|  | R | 0 | 0 | 7 | 33 | 104 | 166 | 281 | 340 | 353 | 363 | 365 |
| 6-2 | L | 0 | 0 | 10 | 28 | 85 | 184 | 271 | 324 | 348 | 351 | 358 |
|  | R | 0 | 0 | 14 | 27 | 81 | 174 | 296 | 333 | 348 | 360 | 360 |
| 6-3 | L | 0 | 0 | 12 | 17 | 66 | 146 | 233 | 263 | 318 | 320 | 339 |

TABLE-continued

| E.A. | S R. | 1 | 2 | 3 | 4 | 5 | 6 | 7 | 8 | 9 | 10 | 11 |
|---|---|---|---|---|---|---|---|---|---|---|---|---|
|  | R | 0 | 0 | 8 | 33 | 54 | 141 | 232 | 262 | 286 | 325 | 338 |
| 6-4 | L | 0 | 0 | 1 | 22 | 33 | 68 | 179 | 211 | 229 | 241 | 249 |
|  | R | 0 | 0 | 0 | 19 | 49 | 90 | 181 | 236 | 252 | 259 | 263 |
| 6-5 | L | 0 | 0 | 0 | 0 | 0 | 0 | 0 | 0 | 0 | 0 | 0 |
|  | R | 0 | 0 | 0 | 0 | 0 | 0 | 0 | 0 | 0 | 0 | 0 |
| 6-6 | L | 0 | 0 | 0 | 0 | 0 | 0 | 0 | 0 | 0 | 0 | 0 |
|  | R | 0 | 0 | 0 | 0 | 0 | 0 | 0 | 0 | 0 | 0 | 0 |
| 7-1 | L | 0 | 0 | 11 | 33 | 89 | 183 | 254 | 302 | 328 | 346 | 356 |
|  | R | 0 | 0 | 13 | 20 | 65 | 133 | 225 | 269 | 303 | 326 | 327 |
| 7-2 | L | 0 | 0 | 7 | 17 | 89 | 176 | 259 | 345 | 360 | 366 | 368 |
|  | R | 0 | 0 | 4 | 26 | 78 | 159 | 238 | 313 | 328 | 344 | 345 |
| 7-3 | L | 0 | 0 | 8 | 33 | 65 | 99 | 155 | 189 | 229 | 248 | 254 |
|  | R | 0 | 0 | 3 | 24 | 49 | 89 | 164 | 242 | 255 | 258 | 262 |
| 7-4 | L | 0 | 0 | 0 | 0 | 0 | 0 | 0 | 0 | 0 | 0 | 0 |
|  | R | 0 | 0 | 0 | 0 | 0 | 0 | 0 | 0 | 0 | 0 | 0 |
| 7-5 | L | 0 | 0 | 0 | 0 | 0 | 0 | 0 | 0 | 0 | 0 | 0 |
|  | R | 0 | 0 | 0 | 0 | 0 | 0 | 0 | 0 | 0 | 0 | 0 |
| 8 | L | 60 | 70 | 82 | 128 | 241 | 313 | 338 | 344 | 349 | 352 | 353 |

The Fifth Experiment

A mixture solution of 2.0 Wt % sodium alginate, 1.0 Wt % calcium nitrate, 1.0 Wt % potassium pyrophosphate, 6.0 Wt % magnesium carbonate, and 90.0 Wt % water, which had been agitated, was used as a gelling. For the purpose of making each cylindrical gel block, the gelling was poured into a cylindrical mold having the inside diameter of 18 mm and the depth of 100 mm and was hardened by cooling at room temperature.

After each gel cylindrical block had been hardened, a through hole was pierced therein similarly to the third experiment so as to form a gel culture medium. A seed is sown into each gel culture medium similarly to the third experiment so as to germinate.

The seed of the experimental area 5 were sown similarly to those of the third experiment.

The seeded gel culture media of the experimental areas 6 (6-1 to 6-6) and 7 (7-1 to 7-5) were dried similarly to those of the third experiment.

The result of measure of the percentages of moisture content of those of the experimental areas 6 are reported in the following Table.

TABLE

| Experimental Area | 6-1 | 6-2 | 6-3 | 6-4 | 6-5 | 6-6 |
|---|---|---|---|---|---|---|
| Drying Hours | 4 | 8 | 12 | 16 | 20 | 24 |
| Moisture Content (%) | 81.7 | 70.2 | 61.4 | 47.5 | 8.8 | 8.3 |

The result of measure of the percentages of moisture content of those of the experimental areas 7 are reported in the following Table.

TABLE

| Experimental Area | 7-1 | 7-2 | 7-3 | 7-4 | 7-5 |
|---|---|---|---|---|---|
| Drying Hours | 1 | 1.5 | 2 | 2.5 | 3 |
| Moisture Content (%) | 82.3 | 74.0 | 57.6 | 18.4 | 6.9 |

The seed which had been processed and reserved were sown so as to sprout by the same manner as the third experiment. The results of quantity of seed of each experimental area which sprouted are reported in the following Table. In the Table, reference initials and numbers designate the same with the third experiment.

TABLE

| E.A. | S.R. | 1 | 2 | 3 | 4 | 5 | 6 | 7 | 8 | 9 | 10 | 11 |
|---|---|---|---|---|---|---|---|---|---|---|---|---|
| 5 | L | 54 | 59 | 76 | 109 | 227 | 273 | 284 | 291 | 295 | 297 | 299 |
|  | R | 312 | 312 | 312 | 313 | 313 | 313 | 313 | 313 | 313 | 313 | 314 |
| 6-1 | L | 0 | 0 | 9 | 31 | 79 | 185 | 249 | 304 | 333 | 348 | 353 |
|  | R | 0 | 0 | 14 | 19 | 62 | 126 | 198 | 258 | 297 | 319 | 337 |
| 6-2 | L | 0 | 0 | 11 | 21 | 90 | 158 | 254 | 345 | 354 | 363 | 364 |
|  | R | 0 | 0 | 18 | 28 | 74 | 160 | 247 | 319 | 328 | 342 | 345 |
| 6-3 | L | 0 | 0 | 7 | 28 | 78 | 200 | 263 | 287 | 327 | 344 | 358 |
|  | R | 0 | 0 | 13 | 24 | 91 | 184 | 264 | 347 | 356 | 358 | 360 |
| 6-4 | L | 0 | 0 | 0 | 21 | 49 | 90 | 151 | 227 | 242 | 245 | 250 |
|  | R | 0 | 0 | 6 | 35 | 51 | 71 | 138 | 181 | 223 | 233 | 242 |
| 6-5 | L | 0 | 0 | 0 | 0 | 0 | 0 | 0 | 0 | 0 | 0 | 0 |
|  | R | 0 | 0 | 0 | 0 | 0 | 0 | 0 | 0 | 0 | 0 | 0 |
| 6-6 | L | 0 | 0 | 0 | 0 | 0 | 0 | 0 | 0 | 0 | 0 | 0 |
|  | R | 0 | 0 | 0 | 0 | 0 | 0 | 0 | 0 | 0 | 0 | 0 |
| 7-1 | L | 0 | 0 | 8 | 21 | 79 | 175 | 265 | 321 | 338 | 350 | 358 |
|  | R | 0 | 0 | 15 | 28 | 88 | 184 | 306 | 339 | 354 | 360 | 364 |
| 7-2 | L | 0 | 0 | 4 | 23 | 57 | 153 | 214 | 273 | 298 | 325 | 345 |
|  | R | 0 | 0 | 8 | 39 | 90 | 196 | 298 | 324 | 339 | 363 | 358 |
| 7-3 | L | 0 | 0 | 2 | 16 | 38 | 63 | 126 | 157 | 209 | 224 | 237 |
|  | R | 0 | 0 | 1 | 31 | 47 | 76 | 134 | 167 | 185 | 225 | 244 |

TABLE-continued

| E.A. | S.R. | 1 | 2 | 3 | 4 | 5 | 6 | 7 | 8 | 9 | 10 | 11 |
|------|------|---|---|---|---|---|---|---|---|---|----|----|
| 7-4  | L    | 0 | 0 | 0 | 0 | 0 | 0 | 0 | 0 | 0 | 0  | 0  |
|      | R    | 0 | 0 | 0 | 0 | 0 | 0 | 0 | 0 | 0 | 0  | 0  |
| 7-5  | L    | 0 | 0 | 0 | 0 | 0 | 0 | 0 | 0 | 0 | 0  | 0  |
|      | R    | 0 | 0 | 0 | 0 | 0 | 0 | 0 | 0 | 0 | 0  | 0  |
| 8    | L    | 51 | 59 | 73 | 135 | 239 | 310 | 324 | 337 | 342 | 343 | 345 |

The Results

The results of the above third, fourth, and fifth experiments are as the follows:

As shown in the results of the experimental areas 6-5, 6-6, 7-4 and 7-5, when the germinating seed were dried so long as their moisture contents reached less than 25%, they did not sprout. The initiated seeds and roots thereof were thought to be dead.

The rate of sprouting of the seed directly sown into soil without gel culture media were lower than that of the germinating seed surrounded by gel culture media, as shown in the experimental areas 5 and 8. It is suggested that there were some defective seed and some seed injured through the soil in the seed of the experimental area 5, and the seed surrounded by gel culture media of the experimental area 8 were promoted to grow up after germination because the fertilizer and the like, which were mixed with gel, promoted their growth after germination.

Furthermore, the rate of sprouting of the germinating seed surrounded by gel culture media of the other experimental areas 6-1, 6-2, 6-3, 6-4, 7-1, 7-2, and 7-3, which had been dried, was substantially the same as that of the germinating seed surrounded by gel culture media of the experimental area 8, which had not been dried. There was not shown that drying exerted a bad influence upon them. As a result, even if gel culture media including germinating seed are dried so long as the moisture content thereof reaches between 50 and 90%, just when they are restored by supplying water, they can sprout at substantially the same rate as the seed which have not been dried.

The above processing of a gel culture medium for reservation according to the present invention brings the following effects:

Since gel culture media are dried after seed sown therein have sprouted or after germinating seed are inserted therein, seed which have not germinated can be removed so as to increase the rate of sprouting, thereby avoiding waste of gel culture media.

Also, since the volume and weight of gel culture media can be reduced by drying, they can be carried easily and the space for reservation and transfer can be small so as to reduce the cost, particularly in case that seeded gel culture media are produced in large quantities. Furthermore, they can be reserved for a long time, so that many gel culture media including germinating gel can be produced until transplanting period and can be restored to the original corresponding to the transplanting period and can be transplanted in requested quantity. The restoring is easy because of requiring just supplying water.

What is claimed is:

1. A method of preserving seeds in a germinating state, comprising the steps of:

encapsulating each seed by gel at a thickness sufficient to surround sprouts when the seed germinates;

germinating the seeds within the gel;

volatilizing moisture of the gel of the encapsulated germinated seeds to a moisture content of 50% to 90% to suppress further growth of the seed, with a consequent reduction in the volume of the gel; and storing the volatilized encapsulated seed in a dormant condition.

2. A method according to claim 1, wherein the gel encapsulating the seed is spherically shaped.

3. A method according to claim 2, wherein, in the encapsulating step, the seed is coated with the gel.

4. A method according to claim 1, wherein the gel encapsulating the seed is cylindrically shaped.

5. A method according to claim 4, wherein the cylindrical gel has a vertical opening, and in the encapsulating step, the seed is inserted into the vertical opening.

6. A method according to claim 1, wherein the gel comprises fertilizers for the seed.

7. The method according to claim 1, further comprising, between the germination step and the dehydration step, a step of separating seeds, if any, which do not germinate or whose sprouts break through the gel.

8. The method according to claim 1, wherein the volatilization step is conducted in an environment through which dry air having a relative humidity of 10% and a temperature of 30° C. blows.

9. The method according to claim 1, wherein the encapsulation is conducted by covering each seed with a gel film, wherein the seed has an area not touching the gel.

10. A gel-encapsulated seed, which is germinated but dormant in the gel having a moisture content of 50–90%, said encapsulated seed being obtained by a method comprising the steps of:

encapsulating a seed by gel at a thickness sufficient to surround sprouts when the seed germinates;

germinating the seed within the gel volatilizing moisture of the gel of the encapsulated germinated seed to a moisture content of 50% to 90% to suppress further growth of the seed, with a consequent reduction in the volume of the gel; and storing the volatilized encapsulated seed in a dormant condition.

11. An encapsulated seed in gel according to claim 10, wherein the gel encapsulating the seed is spherically shaped.

12. An encapsulated seed in gel according to claim 10, wherein the gel encapsulating the seed is cylindrically shaped.

13. An encapsulated seed in gel according to claim 10, wherein the gel comprises fertilizers for the seed.

14. The method according to claim 10, wherein the encapsulation is conducted by covering each seed with a gel film, wherein the seed has an area not touching the gel.

15. A method for culturing a plant, comprising:

obtaining an encapsulated seed according to claim 10;

sowing the encapsulated seed;

adding water to the sown seed for water restoration; and culturing the restored seed.

* * * * *